Figure 1:
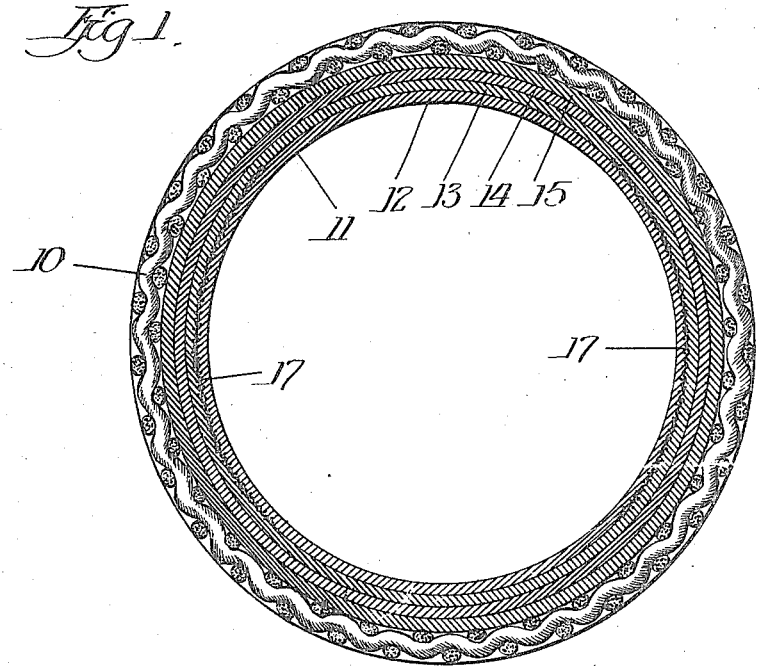

E. S. NICEWARNER.
LAMINATED TUBE.
APPLICATION FILED MAR. 21, 1913.

1,164,303.

Patented Dec. 14, 1915.

Witnesses:

Inventor:
Edward S. Nicewarner
by attorney

UNITED STATES PATENT OFFICE.

EDWARD S. NICEWARNER, OF CHICAGO, ILLINOIS.

LAMINATED TUBE.

1,164,303.

Specification of Letters Patent.   Patented Dec. 14, 1915.

Application filed March 21, 1913.   Serial No. 755,927.

*To all whom it may concern:*

Be it known that I, EDWARD S. NICE-WARNER, a citizen of the United States, and a resident of Chicago, in the county of Cook and State of Illinois, have invented certain new and useful Improvements in Laminated Tubes, of which the following is a specification.

My invention relates in general to tubular structures and more particularly to conduit tubes for fluids and has special reference to composite or laminated tubes including an outer portion or shoe and an inner portion or lining.

While tubes embodying my present invention are of a wide range of utility and a number of different structures such as tires, pipes, and the like, may employ my invention to advantage, I find it of particular usefulness in connection with flexible hose and especially that type of hose which is commonly known as fire hose, this article of manufacture being desirably of great flexibility not only laterally in order that it may be carried through tortuous passages, but also longitudinally in order that it may be stored in a small space when not in use, as by winding it upon a reel, weaving it back and forth in a wagon-bed, or hanging it in coils from a rack.

In order that fire hose may occupy the minimum space when not in use, it is commonly manufactured so that it will collapse along predetermined lines upon removal of the internal pressure, thus permitting it to be stored flat, and since fire hose commonly includes an outer portion or shoe of non-distensible cotton or linen fabric and an inner portion or lining of relatively soft rubber, the inner portion or lining invariably creases in a number of places upon collapsing and eventually presents fractures along the line of such creases, at the opposite disposed bending points formed to facilitate the collapse of the tube. Water entering these fractures, in cases where the rubber lining and the outer coating are united by the adhesive power of the rubber to secure a laminated fabric, tends either to leak through the hose, and to render it impracticable if not substantially impossible to thoroughly dry out the outer coating, with consequent rotting out and eventual rupture of the outer coating and destruction of the hose, or to immediate bursting of the outer coating.

I am aware that it has heretofore been proposed to reinforce structures of the present character by the employment of rubber insets or by thickening the rubber of the lining adjacent the bending points of the hose, and also that it has been proposed to apply exteriorly of the hose cover—not the lining thereof—thick strips of fabric to form strengthening or stiffening ribs in aid of the support of the hose. Such strips, however, do not prevent cracking of the lining, and are not included within the scope of my invention, since they are useless for my present purposes, because thickening of the rubber lining at the bending point, whether by increasing the diameter of the sheet of lining material or adding an auxiliary strip, prevents neither cracking of the lining nor seepage of water between the several sheets thereof, or between the lining and the cover, but aggravates such cracking upon flattening of the hose, because under such circumstances due to the additional thickness greatly increasing the condensation of the inner periphery of the lining, thus squeezing out the natural moisture thereof, which causes it to dry out and set, and to crack upon inflation or expansion of the hose; and exterior strips, whether flexible or rigid, and of whatever nature, have no apparent effect in preventing such cracking, since they have no bearing on the lining.

The principal objects of my present invention are, therefore, to provide an improved collapsible laminated tube characterized by the provision of means for retarding and as far as possible preventing any creasing and consequent fracture of the inner periphery thereof; the provision of a lining for collapsible tubes having an improved reinforcement located adjacent the inner periphery thereof; together with such other objects as may hereinafter appear.

In attaining the stated objects and certain additional advantages to be below disclosed, I have provided the structure shown in the accompanying drawing, wherein—

Figure 2:
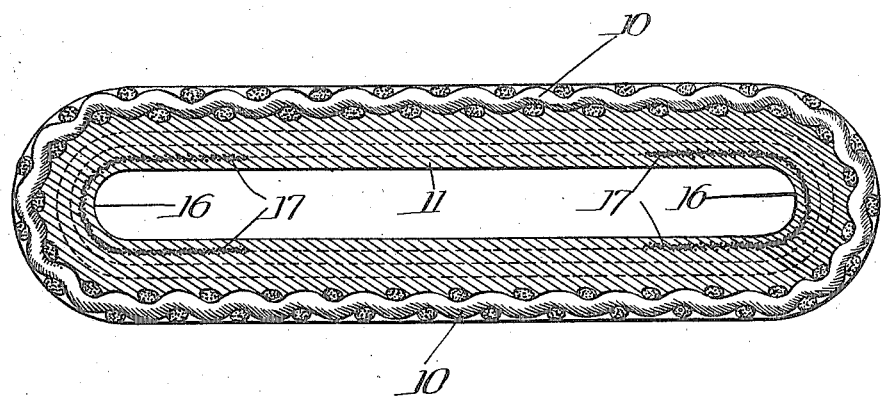

Figure 1 is a transverse sectional view of a fire hose embodying my present improvements in preferred form, the hose being shown in the distended position it assumes when subject to internal pressure before vulcanization; and Fig. 2 is a similar view of the same hose, in the position it assumes on collapsing when the internal pressure is removed.

Referring first to Fig. 1 of the drawing, it will be observed that I have indicated at 10 the outer casing or shoe of the hose, which comprises a suitable tubular fabric, and at 11 the inner coating or lining which is preferably built up of a number of concentric convolutions of rubber, which may be conveniently attained by the employment of a plurality of tubes as is indicated at 12, 13, 14 and 15, such tubes being arranged to be joined together and the structure thus formed to be forced into intimate contact with the member 10 by the well known heat and pressure process of vulcanization not necessary here to describe. After the vulcanizing process the hose is preferably given a form in cross section such as is shown in Fig. 2, which it will at all times assume upon collapsing when the internal pressure of the stream of water is removed, though this form disappears, of course, when the hose is distended by water pressure, since it then assumes the form shown in Fig. 1.

In order to overcome the tendency of the lining 11 to crease and fracture adjacent the bending points indicated at 16—16 (Fig. 2), I insert at or adjacent the inner periphery of the lining 11 longitudinally disposed strips of fabric 17—17, which should extend throughout the entire length of the hose. These strips should preferably be made of relatively thin and tough textile fabric of less thickness than that of the cover 10. The members 17—17 while they should cover the entire bending points 16—16 may if desirable for general reinforcement of the structure extend throughout the entire inner periphery thereof, and while I find it convenient to place the strips 17—17 between the two innermost convolutions, to-wit: between the tubes 12 and 13, when manufacturing hose according to the process above described, since this implacement enables me to readily hold the members 17—17 in predetermined position and especially since it prevents such strips or any part thereof from becoming dislodged from the lining 11 and thereby reducing the diameter of the hose or tending to choke the nozzle commonly used in connection therewith, it is not essential that such strips be sunk beneath the inner periphery of the lining 11 but may be located at such periphery instead of adjacent thereto as shown.

Having thus described my invention and illustrated its use, what I claim as new and desire to secure by Letters Patent is:

1. A tubular structure comprising an outer coating and an inner lining of rubber, the inner lining being provided adjacent its inner periphery with a longitudinally disposed flexible fabric reinforcement.

2. A tubular structure adapted to be collapsed comprising an outer cover of fabric and an inner lining of rubber, the lining being provided adjacent its inner periphery with a longitudinally disposed flexible fabric reinforcement.

3. A tubular structure adapted to be collapsed comprising an outer cover of fabric, and an inner lining of rubber fixed in predetermined relation thereto, the said coating and lining being formed to bend at a predetermined point, and the inner lining being provided with a longitudinally disposed flexible fabric reinforcement adjacent the inner periphery thereof and disposed upon said bending point.

4. A tubular structure adapted to be collapsed comprising an outer cover of fabric, and an inner lining of rubber fixed in predetermined relation thereto, the said coating and lining being formed to bend at predetermined points, and the inner lining being provided with a pair of substantially parallel flexible fabric reinforcements adjacent the inner periphery thereof, one disposed upon each of said bending points.

5. A collapsible tubular structure comprising an outer cover of woven flexible fabric and an inner lining of rubber, the lining being provided adjacent its inner periphery with a flexible fabric reinforcement of a thickness less than that of said cover.

6. A collapsible tubular structure comprising an outer cover of woven flexible fabric and an inner lining of rubber, the lining being provided adjacent its inner periphery with a flexible fabric reinforcement embedded in the inner periphery of the lining.

7. A collapsible tubular structure comprising an outer cover or shoe composed of warp and woof fibrous cords woven together and an inner lining composed of a plurality of sheets of rubber fixed in predetermined relation to each other and to said shoe, the said shoe and lining being formed to bend at predetermined points, and the inner lining being provided with a flexible fabric reinforcement adjacent the inner periphery thereof and upon said bending points, said inner lining being of substantially the same thickness at all points of its cross section.

8. A collapsible tubular structure comprising an outer cover or shoe composed of warp and woof fibrous cords woven together, and an inner lining composed of a plurality of sheets of rubber fixed in predetermined relation to each other and to said shoe, the said shoe and lining being formed to bend at predetermined points, and the inner lining being provided with a pair of substantially parallel flexible fabric reinforcements adjacent the inner periphery thereof, one disposed upon each of said bending points, and said inner lining being of substantially the same thickness at all points of its cross section.

In testimony whereof I have hereunto signed my name in the presence of the two subscribed witnesses.

EDWARD S. NICEWARNER.

Witnesses:
MARTHA WESTMAN,
PAUL CARPENTER.